Oct. 22, 1935.   O. BRATZ   2,018,344
POWER TRANSMITTING DEVICE
Filed Nov. 13, 1933
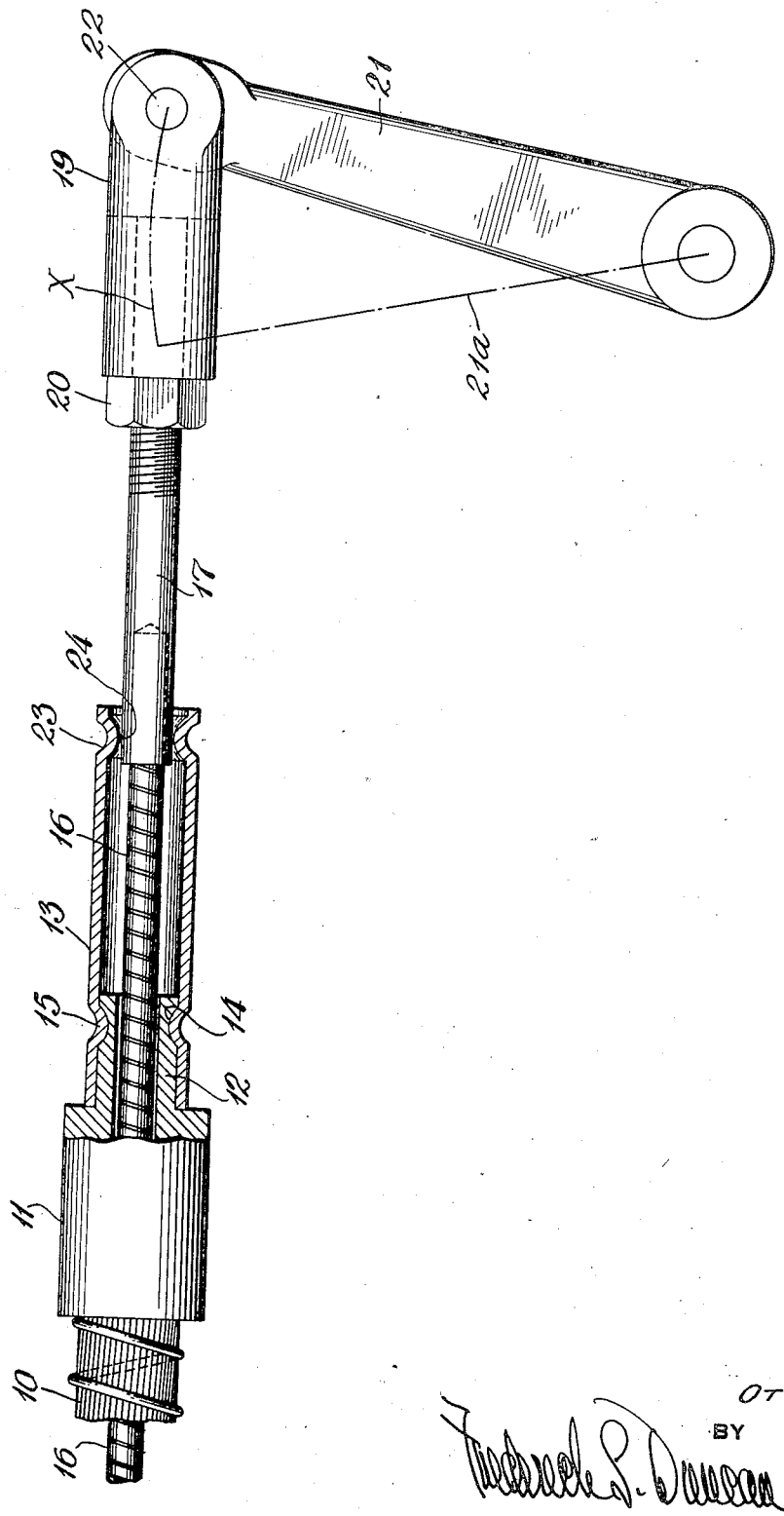
INVENTOR
OTTO BRATZ
BY
ATTORNEY Patented Oct. 22, 1935

2,018,344

UNITED STATES PATENT OFFICE 2,018,344

POWER TRANSMITTING DEVICE

Otto Bratz, Adrian, Mich., assignor to American Cable Company, Inc., Bridgeport, Conn., a corporation of Delaware Application November 13, 1933, Serial No. 697,877

4 Claims. (Cl. 74—502)

The present invention relates to power transmitting devices of the reciprocating type comprising in general a tubular casing or guide member through which passes an elongated flexible tension and/or compression member, power being transmitted by effecting longitudinal movement of one member with respect to the other.

An object of the present invention is to provide a structure of the character described above which is particularly adapted to impart motion to an oscillatable member, such, for instance, as a lever arm.

If the power transmitting member is directly attached to the lever it must not only move lengthwise but also be capable of angular movement in the plane of oscillation of the lever in order to accommodate itself to the arc of travel of its point of attachment to the lever. Hence, it is a specific object of my invention to provide an improved power transmitting device which will permit of such relative oscillatory movement of the terminal portions of the inner and outer members.

A more specific object of the present invention is to provide the casing member with a rigid sleeve extension, and the inner member with a rigid rod-like extension, the sleeve extension being formed at or adjacent its outer end with means providing a fulcrum for relative oscillation of the rod and sleeve.

With these and other objects in view I shall now describe a preferred embodiment of my invention and thereafter shall point out the novelty and scope of the invention in the claims.

The accompanying drawing is a fragmental side view, partly in section, illustrating a structure embodying my invention.

One end of a flexible tubular casing is shown at 10 in the drawing. This casing may be of well-known construction comprising a set of wires bound together and fitted into ferrules at opposite ends of the casing. One of these ferrules is shown at 11 in the drawing. The ferrule is formed at its outer end with a part 12 of reduced diameter on which a sleeve 13 is fitted. The part 12 is formed with an annular groove or recess 14 into which the sleeve is swaged, as indicated at 15, so as to fasten the sleeve securely to the ferrule. The sleeve extends outwardly to a considerable distance beyond the ferrule and virtually forms a rigid extension of the tubular casing 10. Fitted to slide within the tubular casing is an extended flexible member 16. This may consist of a single wire, a flexible rod, a cable strand, or any other body which may serve as a tension member or a compression member or both. Hereafter, the member 16 will be termed the "strand", although it will be understood that this term is intended to include any suitable structure of the character just described. The strand projects into the sleeve 13 and is firmly secured in a terminal rod 17. The latter is threaded at its outer end into a forked fitting 19 and may be secured at desired adjustment on said fitting by means of a jam nut 20. The forked fitting 19 embraces the end of a lever arm 21 to which it is pivotally secured by a pin 22.

The sleeve 13 is formed with an annular indentation 23 adjacent its outer end so that an annular bearing or fulcrum 24 is formed on the inner surface of the sleeve. The rod 17 is adapted to slide freely in this bearing 24 and may also oscillate therein because the bearing has a convex curvature in axial section.

In operation the ferrule 11 is secured to a fixed support (not shown) and since the rod may oscillate as it slides it will adapt itself to various angular positions which it must take by reason of its pivotal attachment to the lever 21. The drawing shows the lever in its extreme position to the right and the broken line 21a shows the position the lever takes as it is swung to its extreme position toward the left. The center of the pin 22 is thus carried through an arc indicated by the broken line "X" and consequently the rod 17 must oscillate in the bearing or fulcrum 24 as it slides from one position to the other. It will be understood that the bearing 24 is made free enough to permit of the necessary oscillation and that the flexible strand 16 accommodates itself to the tilt of the rod 17. However, the maximum length between the rod 17 and the end of the ferrule portion 12 is such to prevent buckling of the member 16 so that said member is properly guided by the sleeve 13 and its annular fulcrum 24.

While I have described a preferred embodiment of my invention, it will be understood that this is to be taken as illustrative and not limitative and that I reserve the right to make such changes in form, construction and arrangement of parts as fall within the spirit and scope of the following claims.

I claim:

1. In combination, a flexible tubular casing formed with a rigid terminal sleeve portion, a flexible strand slidable in the casing and having a rigid terminal rod portion fixed thereto, and means on the sleeve portion providing a fulcrum for relative oscillation of the sleeve and rod.

2. In combination, a flexible tubular casing formed with a rigid terminal sleeve portion, a flexible strand slidable in the casing and having a rigid terminal rod portion fixed thereto, the sleeve portion having a reduced bearing part of convex curvature in axial section adjacent its outer end through which the rod portion may slide and oscillate relatively to the sleeve.

3. In combination, a flexible tubular casing formed with a rigid terminal sleeve portion, a flexible strand slidable in the casing and having a rigid terminal rod portion fixed thereto, the sleeve portion having an annular indentation adjacent its outer end to provide a bearing through which the rod portion may slide and oscillate relatively to the sleeve portion.

4. In combination, a flexible tubular casing formed with a ferrule at one end, a sleeve adapted to fit on the ferrule, means attaching the sleeve to the ferrule to form a rigid extension of the tubular casing, a strand slidable in the casing and formed with a rigid terminal rod portion, the sleeve being provided at its outer end with an annular indentation to serve as a bearing through which the rod may slide and oscillate relatively to the sleeve.

OTTO BRATZ.